Figure 1:
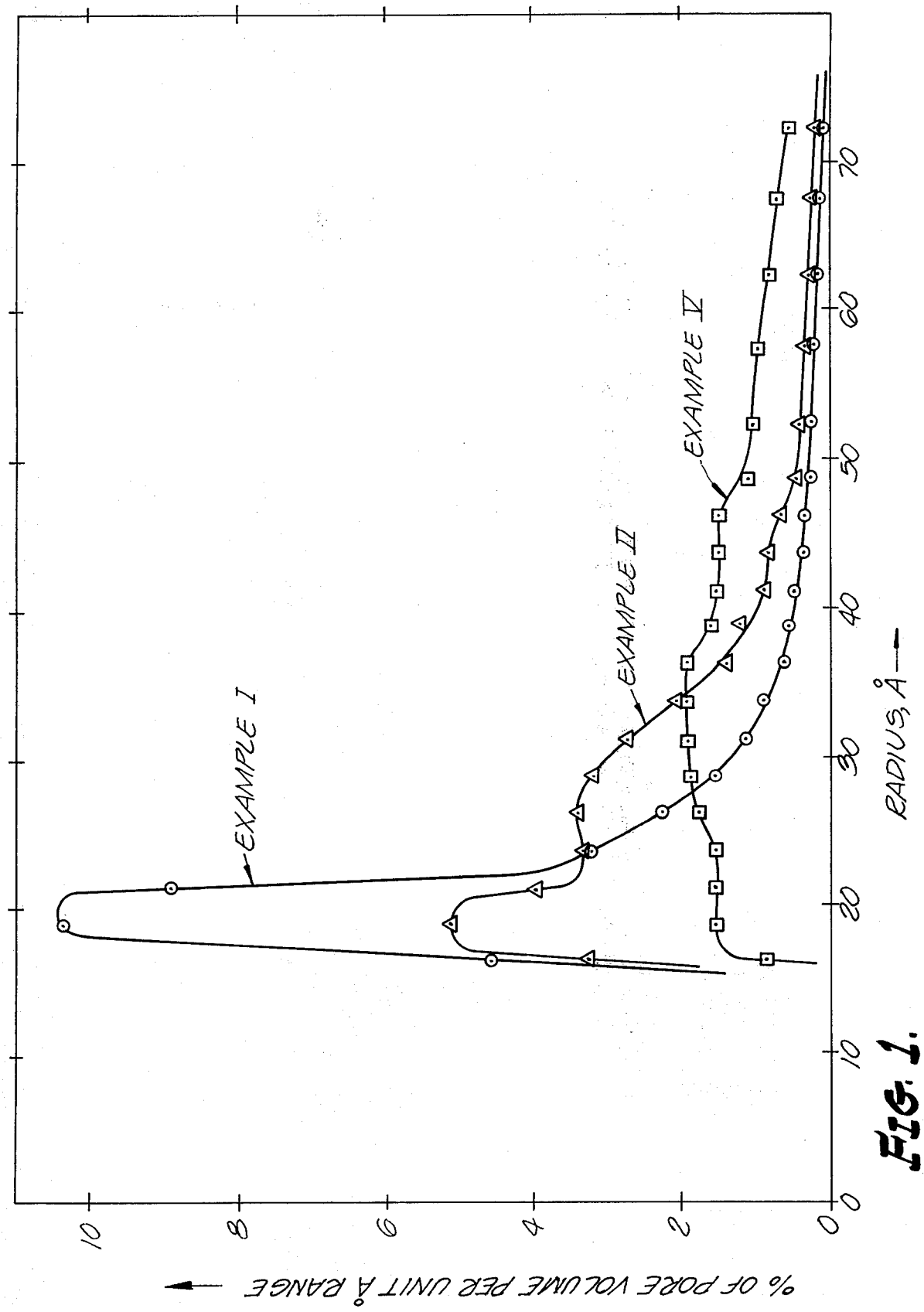

United States Patent [19]

Alafandi

[11] 3,962,135
[45] June 8, 1976

[54] SHAPED CATALYST SUPPORT
[75] Inventor: Hamid Abdel Alafandi, Los Angeles, Calif.
[73] Assignee: Filtrol Corporation, Los Angeles, Calif.
[22] Filed: Dec. 26, 1973
[21] Appl. No.: 428,615

[52] U.S. Cl. ............................ 252/450; 252/455 R
[51] Int. Cl.² .................... B01J 29/00; B01J 29/06
[58] Field of Search .................................... 252/450

[56] References Cited
UNITED STATES PATENTS

| | | | |
|---|---|---|---|
| 2,485,626 | 10/1949 | Mills | 252/450 X |
| 2,551,580 | 5/1951 | Bond, Jr. | 252/450 X |
| 2,579,576 | 12/1951 | Hickey | 252/450 X |
| 2,671,058 | 3/1954 | Mickelson | 252/450 |

*Primary Examiner*—Carl F. Dees

[57] ABSTRACT

A mechanically strong, thermally stable porous siliceous pellet having a high pore volume and surface area with a major portion of the pore volume in pores of radii more than 20 Angstroms and the process of producing the pellets by shaping a clay, acid-leached to a degree insufficient to destroy the plasticity of the clay, forming the leached clay into shaped particles, calcining the particles and further extracting the calcined clay pellets without impairing their shape.

6 Claims, 3 Drawing Figures

SHAPED CATALYST SUPPORT

This invention relates to the production of shaped clay particles suitable as catalyst supports and catalysts employing the same as supports.

As is well known in the art of catalysis, the processes of heterogeneous catalysis require the presence of discrete particles through which the reacting products may be passed under suitable conditions to be converted as required. Depending on the nature of the process, the discrete particles may be positioned in a fixed bed, a moving bed, or suspended in the reactants as in the so-called fluid catalytic processes.

Many catalytic metals and compounds, in their catalytic state are required to be supported by such discrete particles since by themselves in bulk form they are either non-catalytic of so finely divided as not to be suitable for such uses.

The prior art practice is to employ discrete particles of relatively low catalytic properties as bodies on which the catalyst may be distributed. These materials are referred to as catalyst supports. It is an object of this invention to produce a support from a sub-bentonite clay. Such clays after acid treatment are being employed as adsorbents and as catalysts.

I have found that I may produce a useful catalyst support from the acid-treated sub-bentonite clays referred to above.

In so doing, I produce an increase in the $SiO_2$ content into the range above about 80% to substantially 100% $SiO_2$ content of the clay on a volatile free basis. In so doing, I impair and may substantially destroy the crystallinity of the sub-bentonite as measure by its X-ray diffraction pattern.

The effect of this treatment is to cause a redistribution of the pores in the various pore size ranges. The treatment to cause an $SiO_2$ increase is carried out to the desired degree as to result in a substantial increase in the percent of the pores that are in the range above 30 A radius and a substantial decrease in the percent pores in the range below 20 A radius. Additionally, the total pore volume per gram increases substantially as the $SiO_2$ content is increased and thus also the total volume that is in the pores of greater than 30 A radius.

The redistribution of the pore volume so that the pore volume in pores greater than 30 A radius is increased provides more ready access to the reactants and permits a more ready escape of the products of the reaction.

Processes operating at high temperature as, for example, in petroleum cracking, reforming, hydroforming, and hydrodesulphurization, operate with feed stocks which result in coke deposition. Such feed stocks in many cases contain metals or metal compounds, for example, nickel and vanadium, which as such or as a result of reaction are converted into compounds which deposit in the pores of the catalyst. The fine pores, for example, those under 20–30 Angstroms pore radii will clog more rapidly than pores of greater radius.

It is, therefore, an object of my invention to produce a catalyst support based on a sub-bentonite montmorillonite clay which has a major proportion of the pore volume in pores above 20 A radius.

It is a further object of my invention to produce a catalyst support based on a sub-bentonite montmorillonite clay in which the total pore volume in pores of greater than 30 A is substantially greater than the pore volume in pores of 20–30 A radius or in pores of less than 20 A radius.

As has been described above, for many catalytic processes, either of the fixed-bed type or of the moving-bed type, the catalyst cannot be used in powder form as it would be blown out of the unit. It is, therefore, required that the catalyst support be in the form of a shaped particle, for example, a pilled or extruded particle, herein referred to as a pellet.

These may be formed when using acid-treated clays by limiting the acid activation of the clay to leave sufficient plasticity to permit them to be formed, for example, by extrusion. In such case, the available pore volumes are present in excessive proportions in a narrow range of pore dimensions, e.g., under about 20 Angstroms radius.

Characteristic pellet dimensions for extruded cylindrical particles are of the order 1/32 to ¼ inch in the minimum dimension and up to about 2 to 5 times that figure in the major dimension. These figures are intended as illustrations and not as a limitation. The pellet dimensions are chosen to obtain the desired stability of the bed and retention of its flow characteristics. For this purpose, it is desirable that the pellets have the required structural strength to resist undue crushing and thus maintain their dimensional integrity.

A serious problem with shaped catalysts and catalyst supports results from their limited structural strength. Movement of the particles in transportation, charging the catalytic equipment and motion in the equipment during processing, causes fragmentation of the particles and production of fines. In the moving bed process, these fines are removed with the exiting fluid from the bed and may unavoidably be discharged to the air. In the fixed bed process, the fines may lead to plugging the reactor, in which case the bed must be removed and the fines separated. Both difficulties are undesirable.

It is one of the advantageous properties of the catalyst supports of my invention that they have sufficient structural strength to avoid excessive fragmentation in processes described above.

Another useful property of the pelleted catalyst of my invention arises from the excellent heat stability of the catalyst. In many catalytic processes operating at high temperatures on carbon-containing compounds, the catalysts become contaminated by carbon or carbon-containing products of catalysis. It is conventional in such processes to regenerate the catalyst by burning the residue. The resulting temperatures are usually in excess of the catalysis temperatures.

It is one of the useful properties of my invention that the catalyst supports produced in the process of my invention have a surprising heat stability in that heating at temperatures in the range of 1500°–1600° does not materially depreciate the pore volume or surface areas of the catalyst support of my invention.

In order to form the acid-treated clay into pellets, to act as catalyst supports, the original acid treatment with, for example, sulfuric, hydrochloric or nitric acid, must be limited so that the plasticity of the clay be not destroyed. In the conventional acid treatment, for example, of sub-bentonite (montmorillonite) clays, the $SiO_2$ content is raised to about 70–75% by weight on a volatile free basis.

As described above, in order to obtain catalyst supports which have desirable pore volumes and favorable pore size distribution, surface area, heat stability, and mechanical strength, the acid treatment is carried out according to my process to extract additional $Al_2O_3$ from the montmorillonite lattice by treatment with one of the above acids. But if such degree of extraction is made on a powdered unextracted clay, the plasticity of the clay is impaired to a degree as to make the shaping of the acid-treated clay impractical.

I have, however, found that a calcined pellet formed of plastic acid treated sub-bentonite clay may be further acid treated with one of the above acids to increase its $SiO_2$ content to above 80–85% by weight and on recalcination will produce a catalyst base with desirable pore volume distribution where the pore volume in pores of 20–30 A radius and in pores above 30 A radius is made greater than in the pores below 20 A radius and is also of suitable hardness and good heat stability.

While I do not wish to be bound by any theory as to the effect of this improved pore volume distribution, it may be pointed out that the opening up of the pores by increasing the volume in the pores of greater radii increases the ready access of the reactants to the pores of smaller diameter due to the spatial interconnection of the pores. The plugging effect of metal compounds, and of carbon deposited during subsequent use as a catalyst or catalyst carrier is thus minimized.

I am thus able to obtain a pelleted clay base having a $SiO_2$ content above 80% at which $SiO_2$ content, the acid treated sub-bentonites are not sufficiently plastic to be shaped into pellets.

The additional acid treatment removes additional lattice cations which may deleteriously affect the activity of catalytic metals or compounds which may be deposited on the catalyst support.

I have achieved a clay shaped, for example, into a pellet of relative high surface area and pore volume in an extended range of pore radii, and of suitably high resistance to crushing and good thermal stability by first activating a sub-bentonite clay by acid leaching to remove the exchange cations from the lattice and to partially remove the alumina from the clay lattice to a degree which does not destroy the plasticity of the clay, and I am thereby able to shape the clay to the desired shape. I set the structure by calcining it. At this point in the treatment, the volume in pores of less than 20 A radius is greater than in pores of more than 30 A radius. I then am able to further extract the alumina content of the clay by a further acid treatment and calcination without destroying the structural integrity of the shaped clay. The degree of leaching and calcination is sufficient to produce a nonswelling, nonplastic rigid pellet of suitable hardness to resist the crushing of the shaped clay and to be stable at high temperatures in the processes of the catalysis referred to above.

The process caused a destruction of the pores of smaller radii and an increase in the pores of larger radii. The product is a clay particle with the pore volume in pores of radii greater than 30 A substantially greater than in the pores of less than 20 A radii, but it is nevertheless mechanically and thermally stable.

In the preferred embodiment of my invention, I accomplish this result by regulating the temperature at which the initial calcination process is carried out. The degree of extraction after initial calcination may be up to about 100% extraction of alumina to produce a pellet containing up to 100% of silica without impairing the structural integrity of the pellet.

In order to obtain a pellet of suitable hardness, i.e., mechanical stability, particularly when employing a sub-bentonite type of clay which has been extracted by conventional treatment to above 70–75% $SiO_2$, the temperature of calcination of the pellet of acid-treated clay should be below about 1500° F. Following the first calcination step, the extraction of the additional alumina from the calcined clay may be carried out by a single acid-treating step with one of the above acids or by a plurality of acid-treating and calcination steps, which follow the first acid-treating step and without altering the form of the pellet in a substantial sense. The resultant pellet produced by the multiple step of calcination and extraction has had its crystal structure substantially destroyed and if the extraction of the alumina is carried to a sufficient degree, the crystallinity of the clay is substantially completely destroyed as is evident from its X-ray diffraction pattern.

The resultant treatment produces a pellet of improved pore volume in that a substantially greater percentage of the pore volume is in pores having radii in excess of about 20 Angstrom units and particularly above 30 Angstrom units than is found in the original acid-treated and intially calcined clay. The pellet has a useful catalyst holding capacity, satisfactory hardness, and thermal stability and is a useful catalyst support for many processes since it is substantially chemically inert in processes such as referred to below. It has also a substantially greater heat stability than the calcined pellets of lower $SiO_2$ content.

The resultant pellet may be impregnated with a solution of metal salts which are converted into a form suitable for catalytic purposes such as metal or metal compound; e.g., as element, oxide, or sulfide. Since the procedure when employed with conventional catalyst supports is well known, it need not be further described in detail.

This invention may be applied to various clays, such as kaolin or kaolinitic clays, for example, halloysite or ball clay, or the sub-bentonite clays, i.e., the alkaline earth metal montmorillonites.

I prefer, however, to employ for the purposes of my invention the aforesaid sub-bentonite clays.

The product of my invention is useful in catalytic processes, for example, those in which the prior art acid-treated clays with or without catalysis promoting cations have been employed and in many other processes.

Figure 2:
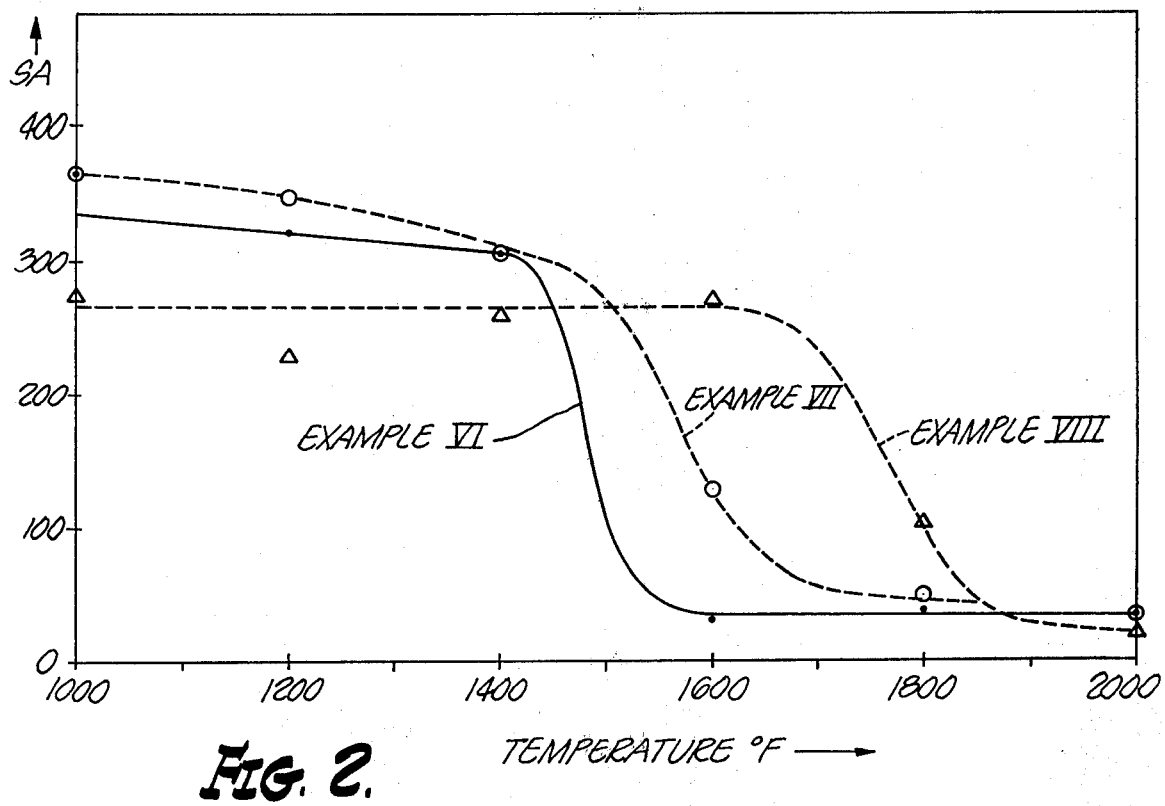
Figure 3:
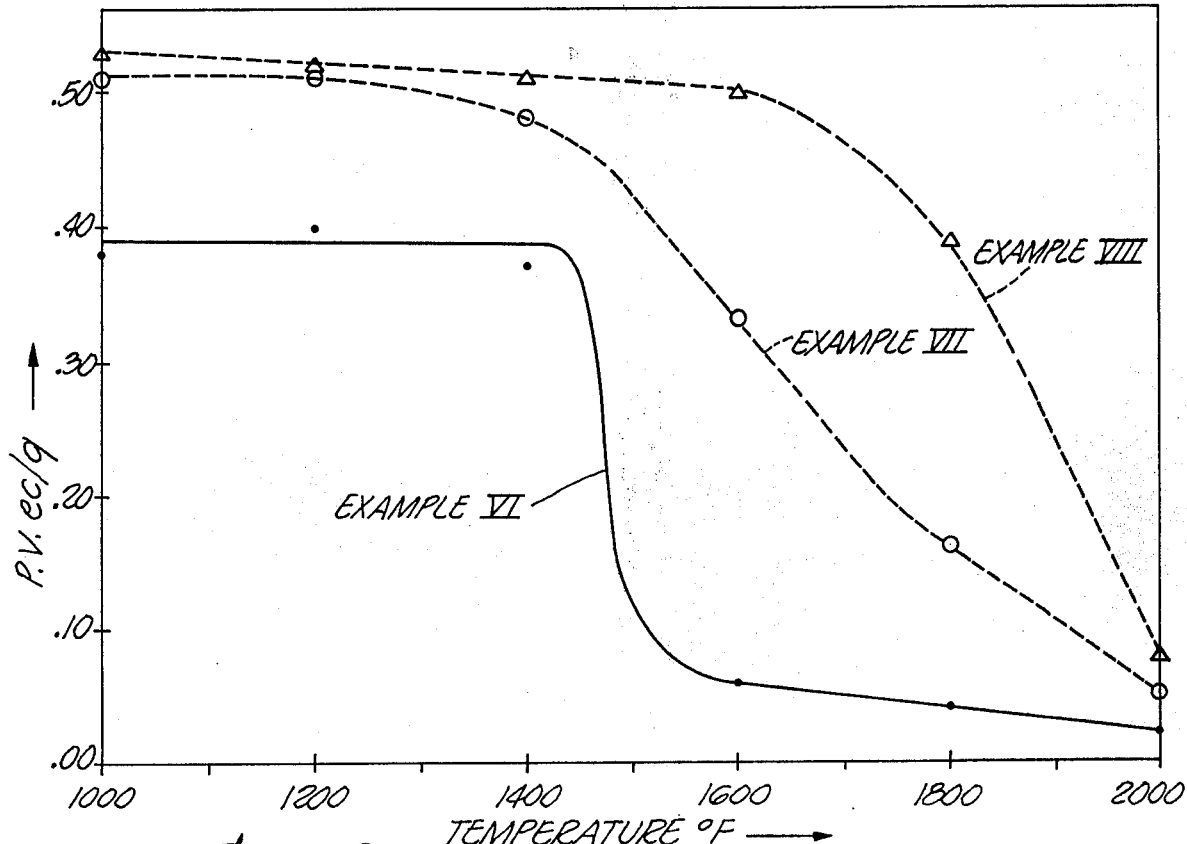

The following examples taken together with the plots of FIGS. 1, 2, and 3 are for the purpose of illustrating my invention and not as a limitation thereof.

The following data is intended for illustrative purposes. Specific samples of clays, temperatures, character of acid, acid concentrations, time of treatment, calcination temperatures, time of calcination, nature of the shaping process may change one or more of the values. However, as explanatory data, they illustrate my invention and may be read in connection with FIGS. 1, 2, and 3 which illustrate my invention.

EXAMPLE I

A sub-bentonite clay mined at Sanders, Arizona was leached with sulfuric acid of 30% concentration at the boiling point of the acid, washed and calcined, resulting in a removal of 10.5% of the clay by the acid leach. The acid-leached clay was washed to remove the acid and salts and dried.

The raw clay had the following composition:

$SiO_2 = 67.1$ wt.%   $Fe_2O_3 = 1.68\%$   $MgO = 6.3\%$
$Al_2O_3 = 21.8$ wt.%   $CaO = 2.77\%$

The acid-leached clay had the following composition:

$SiO_2 = 72.4$ wt.%   $Fe_2O_3 = 1.41$ wt.%   $MgO = 4.14$ wt.%
$Al_2O_3 = 14.2$ wt.%   $CaO = 2.3$ wt.%

In this example, the clay after acid treatment in the manner described above had sufficient residual plasticity so that it could be formed into pellets, for example, cylinders of 3/16 of an inch in length and 1/16 of an inch in diameter by extrusion in the conventional manner for the extrusion of such pelleted clays. The clay pellets were calcined after extrusion at a temperature of 1100° F. for 10 hours.

EXAMPLE II

The calcined clay pellets of Example I were re-extracted with hydrochloric acid 40% concentration at boiling temperature to reduce its alumina content to about 7.4% by weight of the re-extracted clay. The re-extracted clay was washed, dried, and calcined at a temperature of 1100° F. for 10 hours. The pellet retained its shape and had the following compositions:

$SiO_2 = 85.6\%$   $Fe_2O_3 = 0.75\%$   $MgO = 1.57\%$
$Al_2O_3 = 7.4\%$   $CaO = 0.84\%$

At this state, the montmorillonite peaks appearing in the X-ray diffraction patterns of the raw clay and the initially extracted clay are substantially weakened, indicating that a major proportion, more than 50% of the crystalline component, has been converted to an amorphous state.

In the initial treatment, the raw clay containing approximately 21.8% alumina was reduced to about 14.2% by the original acid treatment and then is reduced to 7.4% in the final product, leaving about 85.6% of silica as compared to 67.1% in the raw clay.

The silica content of the pellet may be increased to about 99% silica, leaving substantially no alumina present, by further acid leaching of the clay either in the second leaching step or after a second calcination step as will be described below.

In the above and the following examples, all compositions are reported as percentages by weight on a volatile free basis.

EXAMPLE III

The effect of the initial calcination temperature upon the hardness, i.e, resistance to crushing of the resultant re-extracted pellets is illustrated by the following example. Separate uncalcined clay samples formed according to Example I in which the raw clay has been extracted to the above-noted degree were calcined separately at 700, 900, 1100, 1300, 1500, and 1700° F. each for 10 hours and re-extracted under conditions similar to Example II.

TABLE I

| Temperature of Calcination °F | Hardness Ratio of Calcined and Re-extracted Pellets | $SiO_2$ % by wt. |
|---|---|---|
| 700 | 1 | 85.5 |
| 900 | 1.03 | 84.6 |

TABLE I-continued

| Temperature of Calcination °F | Hardness Ratio of Calcined and Re-extracted Pellets | $SiO_2$ % by wt. |
|---|---|---|
| 1100 | 1.71 | 84.7 |
| 1300 | 1.39 | 82.5 |
| 1500 | 1.12 | 81.8 |

It will be observed that the hardness improves with the temperature of calcination prior to re-extraction until it reaches a temperature of above 1100° F. and depreciates substantially at temperatures of about 1500° F. with a maximum in the range of about 1100° F. Above 1500°, a phase change occurs while hardness increases; but the other properties of the clay as a catalyst support are inferior. When the originally acid-treated clay was calcined at a temperature of 1700° F. and re-extracted under similar conditions, substantially no further extraction of alumina was observed. The clay had a $SiO_2$ content of 74.7% by weight and a hardness ratio of 1.67.

EXAMPLE IV

The pellet produced in Example II may be re-extracted to increase the silica content of the pellet without impairing the pellet shape.

Such pellets were re-extracted with hydrochloric acid of 60% concentration at boiling temperature for 8 hours, washed and calcined at about 1100° F. to produce a pellet of about 95% silica and having a pore volume of about 0.55 cc/gram and a surface area of about 200 to 251 $M^2$/gram. It was further re-leached with 60% hydrochloric acid for 10 hours at boiling point; washed, dried, and calcined at 1100° F. to produce a $SiO_2$ pellet, of about 99% $SiO_2$ weight and a pore volume distribution and surface area substantially the same as in Example V.

EXAMPLE V

The calcined pellets produced according to Example I were heated with 60% solution of 5.5 N HCl for 15 hours at boiling temperature, washed, and dried. The resultant pellets were calcined at 1100° F. for 10 hours. The pellets had their original shape and had the following composition:

$SiO_2 = 97.1\%$   $Fe_2O_3 = 0.53\%$
$Al_2O_3 = 1.1\%$   Alkaline Earth Oxides $= 0.01\%$ The Surface Areas and Pore Volume Distribution are given in Table III and FIG. 1.

The excellent heat stability of the catalyst supports of my invention is illustrated by the following examples:

EXAMPLE VI

Samples acid treated, pelleted, as in Ex. 1, and having 75.3% by weight of $SiO_2$ and 13.2% $Al_2O_3$ by weight on a volatile free basis were submitted to calcination for 10 hours at each of the temperatures stated in Table II.

EXAMPLE VII

A sample of calcined pelleted clay produced as in Example I was re-extracted with 3.5 N HCl at boiling temerature to produce a pelleted clay having 86.2% $SiO_2$ by weight on a volatile free basis and 8.5% $Al_2O_3$ by weight on a volatile free basis. The re-extracted pellets were calcined for 10 hours at each of the temperatures stated in Table II. The pellets retained their original shape in the re-extraction and calcination.

EXAMPLE VIII

Another sample of pellets produced by extraction as in Example I was re-extracted with 5.5 N HCl at boiling temperature to produce a pellet having its original shape and having 94.9% $SiO_2$ by weight on a volatile free basis and 3.6% $Al_2O_3$ on a volatile free basis and then calcined for ten hours at each of the temperatures stated in Table II.

TABLE II

| Calcination Temperature | Example VI Surface Area | Example VI Pore Volume | Example VII Surface Area | Example VII Pore Volume | Example VIII Surface Area | Example VIII Pore Volume |
|---|---|---|---|---|---|---|
| | $M^2$/gm | cc/gm | $M^2$/gm | cc/gm | $M^2$/gm | cc/gm |
| 1000° F | 364 | 0.38 | 366 | 0.51 | 277 | 0.53 |
| 1200° F | 320 | 0.40 | 344 | 0.51 | 232 | 0.52 |
| 1400° F | 306 | 0.37 | 308 | 0.48 | 260 | 0.51 |
| 1600° F | 32 | 0.06 | 130 | 0.33 | 272 | 0.50 |
| 1800° F | 39 | 0.04 | 50 | 0.16 | 105 | 0.39 |
| 2000° F | 33 | 0.02 | 33 | 0.05 | 20 | 0.08 |

These values are plotted on FIGS. 2 and 3.

It will be observed by referring to Tables II and III and FIGS. 1 and 2 that the catalyst supports of my invention have a greater pore volume and surface area than the product produced by leaching to approximately 70–75% $SiO_2$. The products of my invention are much more heat stable in that they may be heated to much higher temperatures without suffering a substantial depreciation in their pore volume and surface area. As compared with the pellets containing $SiO_2$ in the range of 70–75% by weight the catalyst supports of my invention still retain substantial pore volume and surface area at temperatures above 1400° F, for example 1500° F, whereas at 1500° F and higher, the structure of extracted clay pellets of 75.3% $SiO_2$ (Example VI) has had its pore volume and surface area drastically reduced.

On the other hand, the product of Example VII still retains appreciable structure as is shown by its pore volume and surface area. The product of Example VIII may be heated to 1700° F and higher before an appreciable reduction in pore volume and surface area is observed.

The products in the above examples were tested to determine the total pore volume in cc/gram, the volume occupied by pores of various radii, and the total surface area in sg. meters/gram.

Surface area was determined by the method described in the article by P. H. Emmett in "Advances in Catalysis," Vol. 1, 1948, pp. 64–89, Academic Press, N.Y. Pore volume and pore volume distribution were obtained from the desorption branch of the nitrogen adsorption isotherm following the method described by E. P. Barrett et al, J.A.C.S., Vol. 73, p. 373 et seq (1951). All surface area data is stated herein as square meters per gram of sample ($M^2$/gm), all pore volumes stated herein are in cubic centimeters per gram (cc/gm) of sample.

Table III shows values for products produced according to the process of the above examples.

The novel and unexpected effect of pelleting of acid treated clay, followed by calcination and re-extraction and the novel and unexpected pore size distribution spectrum are exemplified by the pellets in Examples I, II, and V.

TABLE III

| EXAMPLE | Pore Vol. % in Pores Less Than 20 A | Pore Vol. % in Pores 20–30 A | Pore Vol. % in Pores More Than 30 A | Total Pore Vol. cc/gm | Surface Area $M^2$/gm | % $SiO_2$ |
|---|---|---|---|---|---|---|
| I | 37.5 | 40 | 22.5 | .412 | 346 | 72.4 |
| II | 21.7 | 35 | 44 | .464 | 305 | 85.6 |
| V | 7.3 | 16.4 | 76 | .54 | 206 | 97.1 |

The re-extraction of the previously extracted and pelleted clay to increase the percent $SiO_2$ above 80–85% $SiO_2$ results in an increase in the percent of the volume of the pores of radius greater than 30 A. This transfer of volume from the pores having radii less than 30 A to those having more than 30 A is more pronounced as the degree of extraction increases as will be seen from Table III. The pore volume in pores of more than 20 A decreases as the degree of extraction of $Al_2O_3$ increases. As the percent $SiO_2$ increases, the pore volume shifts additionally so that more than about three quarters of the pore volume is in the pores of more than 20 A radius, at 80–85 wgt. % $SiO_2$.

The pellets of 80 or more wgt. % of $SiO_2$, have more than three quarters of the pore volume in pores greater than 20 A radius. Of the volume which is in the pores of greater than 20 A radius, a major proportion, that is, more than 50% of this volume is in pores of radii greater than 30 A. They will give a catalyst life which will be much longer than those catalysts in which the major pore volume is contained in pores of radii which are less than about 20–30 A and which tend to clog by reason of the deposition of solid materials as a result of the catalyst reaction.

EXAMPLE IX

A catalyst base similar to that produced according to Example V was treated with a solution of ammonium molybdate and a solution of cobalt nitrate in the manner conventionally used to introduce the molybdate and cobalt ions. The resultant catalyst contained these ions expressed as oxides as follows: 11.2% $MoO_3$ and 2.9% CoO, all by weight.

A vapor phase desulfurization was conducted by employing a feed material of 2% (volume) of thiophene ($C_4H_4S$) in normal heptane. Thiphene is considered a good test molecule since it is more resistant to hydrogenolysis than other sulfur compounds in the same boiling range. Process conditions were: 750 psig hydrogen at a flow rate of 2 liters/minute; liquid hourly space velocity of 1.5; 138 cc. of catalyst; reactor temperatures of 600° and 650° F. Under these process conditions, thiophene was completely removed.

Example IX illustrates the usefulness of such catalysts. This test is an especially severe test of the utility of the catalyst support of my invention. See in this connection Shuman & Shalet, "Hydrodesulphurization" in the Catalysis Reviews edited by Heinz Heineman, Vol. 4, page 270 (1971).

The catalysts and catalyst supports of my invention derived from plastic clays, particularly from the sub-bentonite clays described above, can be formed into shaped catalyst bodies such as pellets and extracted with acid to a high degree of silica content and large pore size by the process of my invention.

The clays may thus be extracted in part so that they remain plastic sufficiently to be formed into shaped catalysts. They are calcined. The shaped catalysts retain their shape in the subsequent extract and calcination.

The result is a hard pellet of the favorable pore size distribution described above.

The preferred form of the porous pellet of my invention is produced by extracting a montmorillonite clay with sulfuric or nitric or hydrochloric acid at a concentration, time and temperature to produce a clay having in excess of about 70% $SiO_2$ by weight on a volatile free basis to leave a clay which is sufficiently plastic to form into pellets and thereafter calcining the formed pellets at a temperature in the range of 900° to 1300° F. desirably at about 1000° to about 1100° F. and thereafter extracting the calcined pellets with sulfuric or nitric or hydrochloric acid to reduce the alumina content and to increase the silica content to in excess of 80%–85% by weight on a volatile free basis and to thereafter calcine the re-extracted pellets at a temperature of about 1000° to about 1100° F. for about 10 hours.

The preferred form of the porous pellets of my invention, which have silica contents in excess of 80% by weight on a volatile free basis, has the desirable pore volume distribution in which the major proportion of the pore volume is in pores having radii in excess of 20 A and of the volume which is in pores of greater than about 20 A, the major proportion is in pores in excess of about 30 A radius. Other desirable characteristics of the preferred form of my invention are that the porous pellets which have a silica content in excess of 80% by weight on a volatile free basis, when calcined at 1000° F. for 10 hours have total pore volumes of about 0.4 or more cubic centimeters per gram and surface areas of 200 or more square meters per gram and when calcined at 1600° F. for 10 hours have a pore volume of about 0.3 or more square meters per gram and a surface area in excess of about 100 square meters per gram.

We claim:

1. A process of producing a porous particle which comprises acid-leaching a raw sub-bentonite clay with sulfuric or nitric or hydrochloric acid to remove alumina from the crystal lattice of said sub-bentonite and to produce a plastic clay material having an alumina content substantially less than the raw clay but retaining the montmorillonite crystal structure as evidenced by X-ray diffraction, shaping said acid-leached clay into a shaped particle, calcining said acid-leached particle at a temperature in the range of 900° F. to 1300° F., re-extracting said calcined particles with sulfuric, or nitric, or hydrochloric acid and thereby extracting an additional portion of the alumina remaining after said initial extraction and producing a shaped pellet having substantially the shape of the first-mentioned pellet and more than about 80% $SiO_2$ and calcining said re-extracted clay pellet at a temperature of about 1000° F. to about 1600° F.

2. The process of claim 1 in which the calcination temperatures are in the range of about 1000° F. to about 1100° F. for about 10 hours.

3. The process of claim 1 in which the treatment with hydrochloric or nitric or sulfuric acid produces a shaped pellet of at least about 90% by weight $SiO_2$.

4. The process of claim 3 in which the calcination temeratures are in the range of 1000° F. to about 1100° F. for about 10 hours.

5. The process of claim 1 in which the calcined re-extracted shaped particle has a $SiO_2$ content in the range of 80–85% by weight and is further extracted with $H_2SO_4$ or $HNO_3$ or HCl and again calcined at a temperature in the range of about 1000° F to about 1500° F to produce a pellet substantially free of $Al_2O_3$ and having a $SiO_2$ content in excess of about 90%.

6. The process of claim 5 in which the temperature of calcination is in the range of about 1000° F. to about 1500° F.

* * * * *

UNITED STATES PATENT OFFICE
CERTIFICATE OF CORRECTION

Patent No. 3,962,135             Dated June 8, 1976

Inventor(s)    Hamid Abdel Alafandi

It is certified that error appears in the above-identified patent and that said Letters Patent are hereby corrected as shown below:

Column 1, line 18, "of" should read -- or --.

Column 1, line 34, "measure" should read -- measured --.

Column 4, line 23, "intially" should read -- initially --.

Column 7, line 61, "sg." should read -- sq. --.

Column 9, line 1, "thiphene" should read -- thiophene --.

Column 10, line 11, "WE CLAIM" should read -- I CLAIM --.

Signed and Sealed this

Twenty-fifth Day of January 1977

[SEAL]

Attest:

RUTH C. MASON  
*Attesting Officer*

C. MARSHALL DANN  
*Commissioner of Patents and Trademarks*